(12) United States Patent
Okano et al.

(10) Patent No.: US 7,823,678 B2
(45) Date of Patent: Nov. 2, 2010

(54) MOTORCYCLE WITH VEHICLE SPEED SENSOR

(75) Inventors: Shigetaro Okano, Saitama (JP); Kenji Matsuo, Saitama (JP); Hiroatsu Inui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 391 days.

(21) Appl. No.: 11/106,533

(22) Filed: Apr. 15, 2005

(65) Prior Publication Data
US 2005/0229894 A1    Oct. 20, 2005

(30) Foreign Application Priority Data
Apr. 15, 2004    (JP)    ............................. 2004-120815

(51) Int. Cl.
| B62J 99/00 | (2009.01) |
| G01P 3/488 | (2006.01) |
| G01P 1/02 | (2006.01) |

(52) U.S. Cl. ..................... 180/230; 180/313; 180/337; 180/338; 73/1.41; 324/173; 324/174; 349/441

(58) Field of Classification Search ................ 180/337, 180/313, 230, 338; 73/1.41; 324/173, 174; 340/441; B62J 99/00; G01P 1/02, 3/488, G01P 3/50

See application file for complete search history.

(56) References Cited

U.S. PATENT DOCUMENTS

| 4,056,747 | A | * | 11/1977 | Orris et al. | .................. | 310/155 |
| 4,178,798 | A | * | 12/1979 | Wessel | .......................... | 73/113 |
| 4,504,756 | A | * | 3/1985 | Amano et al. | ................ | 310/168 |
| 4,662,471 | A | * | 5/1987 | Kondo et al. | ................ | 180/226 |
| 4,667,762 | A | * | 5/1987 | Ishino et al. | ................ | 180/226 |
| 4,953,656 | A | * | 9/1990 | Kondo et al. | ................ | 180/226 |
| 5,085,519 | A | * | 2/1992 | Dougherty | .................. | 384/448 |
| 5,098,351 | A | * | 3/1992 | Kobayashi | .................. | 475/86 |
| 5,263,549 | A | * | 11/1993 | Dick | .......................... | 180/226 |
| 5,649,879 | A | * | 7/1997 | Kusumoto et al. | .......... | 475/331 |
| 5,825,176 | A | * | 10/1998 | Babin et al. | ................. | 324/174 |
| 6,082,195 | A | * | 7/2000 | Wallingford | ............. | 73/514.16 |

(Continued)

FOREIGN PATENT DOCUMENTS

EP    0 521 693 A    1/1993

(Continued)

*Primary Examiner*—Toan C To
*Assistant Examiner*—Barry Gooden, Jr.
(74) *Attorney, Agent, or Firm*—Birch, Stewart, Kolasch & Birch, LLP

(57) ABSTRACT

A versatile vehicle speed sensor compactly disposed on the outside in a radial direction of a gear. A motorcycle includes a power unit having a torque take-out shaft for outputting a torque generated by an internal combustion engine as a drive torque for driving a rear wheel, a torque transmission mechanism T which includes a gear pair consisting of bevel gears and a drive shaft and which transmits the drive torque to the rear wheel, and a vehicle speed sensor such that teeth of a driven gear constituting the gear pair constitute a portion to be detected. The vehicle speed sensor includes a main body portion having a detecting portion opposed to the addendum of the teeth in the direction of a normal to the addendum cone surface of the driven gear, and the main body portion extends along the normal direction.

25 Claims, 9 Drawing Sheets

U.S. PATENT DOCUMENTS

| | | | |
|---|---|---|---|
| 6,133,729 A * | 10/2000 | Mierzwinski | 324/174 |
| 6,158,279 A | 12/2000 | Saiki et al. | |
| 6,203,464 B1 * | 3/2001 | Ishikawa et al. | 475/150 |
| 6,326,778 B1 * | 12/2001 | Hummel | 324/173 |
| 7,078,891 B2 * | 7/2006 | Su et al. | 324/174 |
| 2003/0010152 A1 * | 1/2003 | Evans et al. | 74/730.1 |
| 2004/0050366 A1 * | 3/2004 | Kato | 123/470 |
| 2005/0103557 A1 * | 5/2005 | Duncan | 180/338 |
| 2005/0229894 A1 * | 10/2005 | Okano et al. | 123/197.1 |
| 2006/0124106 A1 * | 6/2006 | Ikeda et al. | 123/399 |
| 2006/0173649 A1 * | 8/2006 | Wu | 702/145 |

FOREIGN PATENT DOCUMENTS

| | | |
|---|---|---|
| EP | 0 911 547 A | 4/1999 |
| EP | 0 987 174 A | 3/2000 |
| JP | 04 302764 A | 3/1993 |
| JP | 09 072927 A | 7/1997 |
| JP | 11-208557 A | 8/1999 |
| JP | 11-237395 A | 8/1999 |
| JP | 3209663 B2 | 7/2001 |

* cited by examiner

MOTORCYCLE WITH VEHICLE SPEED SENSOR

CROSS-REFERENCE TO RELATED APPLICATIONS

The present application claims priority under 35 USC 119 to Japanese Patent Application No. 2004-120815 filed on Apr. 15, 2004 the entire contents of which are hereby incorporated by reference.

BACKGROUND OF THE INVENTION

1. Field of the Invention

The present invention relates to a motorcycle comprising a vehicle speed sensor such that the teeth of a gear constituting a torque transmission mechanism for transmitting a drive torque from a power unit to a drive wheel constitute a portion to be detected.

2. Description Background Art

In the motorcycle disclosed in Japanese Patent No. 3209663, a sensor constituting a rear wheel rotational speed device is mounted to a gear case connected to the rear end of a rear fork, and the tip end of the sensor is formed slantly along the tooth surface of a first rear gear of a rear-side bevel gear. This ensures that it is unnecessary to provide a multiple-toothed rotor separately from the first rear gear, as a portion to be detected by the sensor for detecting the rotational speed of the rear wheel.

In the sensor disclosed in Japanese Patent No. 3209663, the tip end thereof is slanted to be along the tooth surface of the first rear gear, while an inserted portion inserted in a gear case extends along a direction orthogonal to the rotational centerline of the first rear gear, so that the tip end extends in a direction different from the direction in which the tip end is opposed to the tooth surface. Therefore, a versatile sensor such that the direction in which the tip end is opposed to the tooth surface and the direction in which the inserted portion extends coincide with each other cannot be used. Thus, this sensor leads to a high cost. Further, since the inserted portion extends in a direction orthogonal to the rotational centerline of the first rear gear, the projection amount of the sensor on the outside in the radial direction of the first rear gear is large. Therefore, it is impossible to compactly dispose the sensor on the outside in the radial direction of the first rear gear. In relation to members disposed in the vicinity of the sensor, there arise limitations in the layout of the sensor and in the laying of electric wires connected to the sensor. In addition, where the sensor is covered with a cover, the cover would be large. Thus, the gap between the tip end of the sensor and the tooth surface which has a relationship with the detection accuracy varies depending on the mount position in the circumferential direction of the sensor, for example, the mount position in the circumferential direction with the center axis line as a center, so that an adjustment of the gap between the tip end of the sensor and the tooth surface takes time, and the mountability of the sensor is poor.

SUMMARY AND OBJECTS OF THE INVENTION

The present invention has been made in consideration with the above-mentioned circumstances. It is an object of the present invention to achieve a reduction in cost, to achieve an enhancement in the mountability of a vehicle speed sensor, and to lay out the vehicle speed sensor compactly on the outside in the radial direction of a gear, through adopting a versatile vehicle speed sensor.

It is a further object of the present invention to lay out the vehicle speed sensor compactly in the vehicle width direction. Another object of the invention is to increase the degree of freedom in laying electric wires connected to the vehicle speed sensor.

The present invention includes a power unit having an engine and a torque take-out shaft for outputting a torque generated by the engine as a drive torque. A torque transmission mechanism includes a gear pair including bevel gears and a drive shaft, for transmitting the drive torque from the torque take-out shaft to a drive wheel. A vehicle speed sensor is provided such that gear teeth of one of a drive gear and a driven gear constituting the gear pair constitute a portion to be detected. The vehicle speed sensor includes a main body portion having a detecting portion opposed to the addendum of the one gear in a direction normal to the face cone surface of the one gear. The main body portion is disposed to extend in the normal direction.

According to this, the direction in which the detecting portion is opposed to the addendum and the direction in which the main body portion extends coincide with each other, so that a versatile ordinary vehicle speed sensor for detection of the rotational speed can be used as a vehicle speed sensor such that the teeth of one gear composed of a bevel gear constitute a portion to be detected. Moreover, since the gap between the vehicle speed sensor and the addendum does not vary depending on the mount position in the circumferential direction of the vehicle speed sensor, it is easy to adjust the gap between the vehicle speed sensor and the addendum for securing detection accuracy. Furthermore, the projection amount of the vehicle speed sensor on the outside in the radial direction of the gear is reduced.

The present invention provides a gear pair that is interposed between the torque take-out shaft and the drive shaft extending in the front-rear direction, the one gear is the driven gear connected to the drive shaft and having a rotational centerline extending in the front-rear direction, and the main body portion is disposed on the outer side in the vehicle width direction relative to the rotational centerline.

This ensures that the projection amount of the vehicle body sensor to the outer side in the vehicle width direction is reduced, notwithstanding the main body portion of the vehicle speed sensor is disposed on the outside in the vehicle width direction.

The present invention provides a meshing portion between the drive gear and the driven gear and the torque take-out shaft that are located on the inner side in the vehicle width direction relative to the rotational centerline.

This ensures that the drive gear and the torque take-out shaft are absent on the outer side in the vehicle width direction relative to the rotational centerline of the gear on one side on which the vehicle speed sensor is laid out, and it is possible to form a space in the surroundings of the vehicle speed sensor.

The present invention provides a combination of elements including a versatile ordinary sensor that can be used as the vehicle speed sensor to achieve a reduction in cost. In addition, since it is easy to adjust the gap between the vehicle speed sensor and the addendum, the mountability of the vehicle speed sensor is enhanced. Further, since the projection amount of the vehicle speed sensor on the outside in the radial direction of the gear is reduced, the vehicle speed sensor can be disposed compactly on the outside in the radial direction of the gear, and the degree of freedom in laying out the vehicle speed sensor is increased.

The present invention provides a combination of elements including a vehicle speed sensor that can be laid out compactly in the vehicle width direction.

The present invention provides a combination of elements including a space that is formed in the surroundings of the vehicle speed sensor. Thus, it is easy to lay electric wires connected to the vehicle speed sensor, and the degree of freedom in the laying is increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, an embodiment of the present invention will be described below referring to FIGS. 1 to 9.

Figure 1:
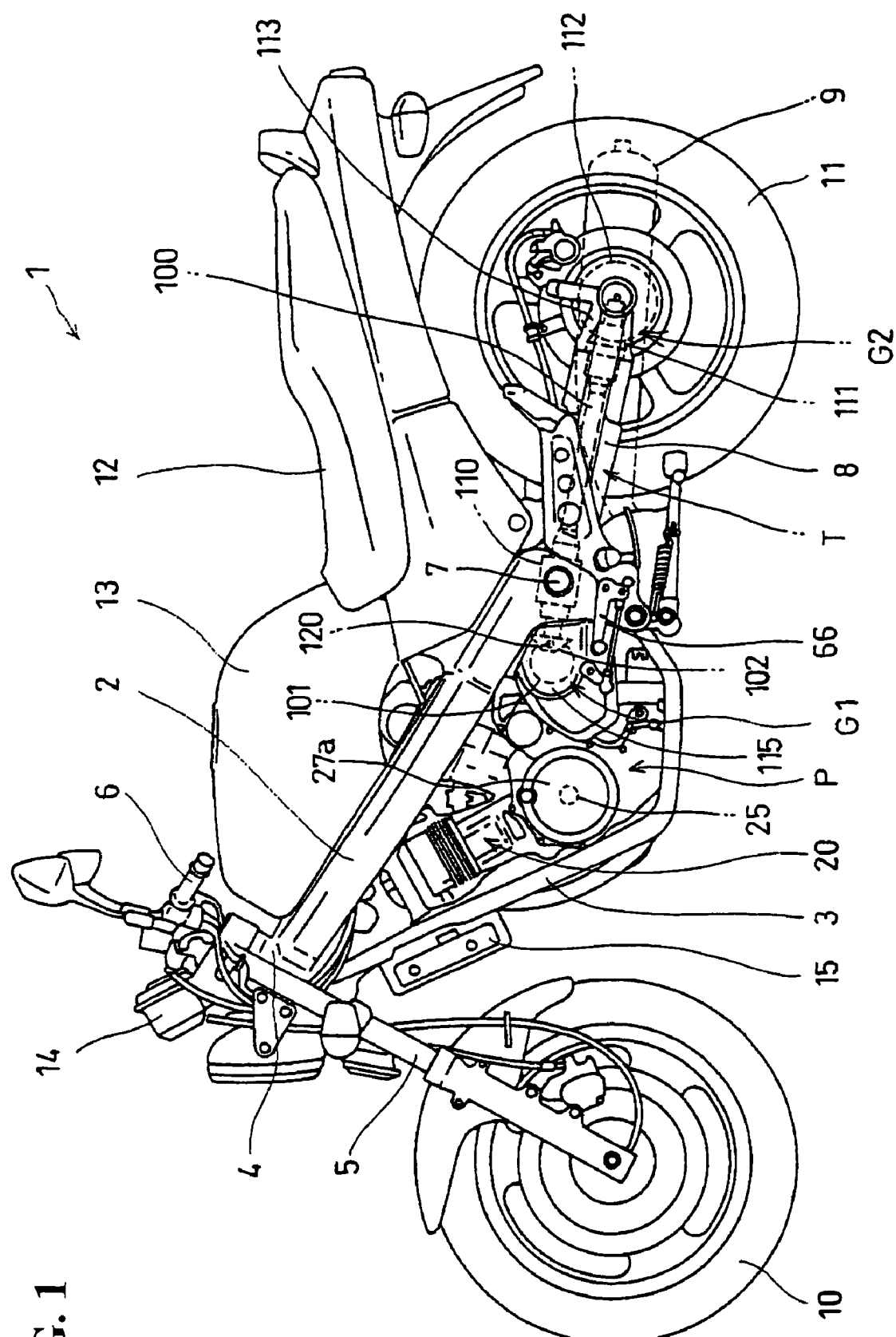
FIG. 1 is a left side view of a motorcycle which is an embodiment of the present invention.

Referring to FIG. 1, a motorcycle 1 to which the present invention is applied includes a vehicle body frame having a left-right pair of main frames 2 and a left-right pair of under frames 3 disposed on the lower side of the main frames 2. A steering handle 6 is fixed to an upper end portion of a front fork 5 that is connected to a steering shaft rotatably supported on a head pipe 4 connected to front end portions of the main frames 2 and the under frames 3. A front wheel 10 is rotatably supported by lower end portions of the front fork 5. A power unit P is supported by the main frames 2 and the under frames 3. A swing arm 8 is swingably supported, at its left-right pair of front end portions, on pivot shafts 7 provided at rear end portions of the left and right main frames 2 with a rear wheel 11 rotatably supported on a rear end portion of the swing arm 8.

Further, the motorcycle 1 includes a seat 12 mounted to seat rails extending rearwardly from the left and right main frames 2. A fuel tank 13 is mounted to the left and right main frames 2 on the front side of the seat 12 with an instrument panel mounted to a member for connecting the front fork 5 and having measuring instruments such as a vehicle speed meter 14. A radiator 15 is mounted to the left and right under frames 3.

A power unit P for generating a drive torque for driving the rear wheel 11 as a drive wheel includes a torque take-out shaft 91 (see FIG. 3) for outputting the drive torque, and the drive torque of the torque take-out shaft 91 is transmitted through an input-side gear pair G1 to a drive shaft 100 extending in the front-rear direction in a tubular swing arm 8 disposed on the left side of the rear wheel 11. Further, the drive torque is transmitted from the drive shaft 100 through an output-side gear pair G2 to the rear wheel 11, to rotatingly drive the rear wheel 11. Both the gear pairs G1, G2 and the drive shaft 100 constitute a torque transmission mechanism T for transmitting the drive torque from the torque take-out shaft 91 to the rear wheel 11. The motorcycle 1 is provided with a vehicle speed sensor 120. The teeth of a gear of the gear pair G1 constitute a portion to be detected with an electronic control unit. A vehicle speed calculated by the electronic control unit supplied with a detection signal from the vehicle speed sensor 120 is displayed on the vehicle speed meter 14.

Incidentally, in the present specification and claims, the outside in the vehicle width direction means a direction of spacing away from a vehicle body center plane C (see FIG. 3) in the vehicle width direction of the motorcycle 1, and the inside in the vehicle width direction means a direction approaching the vehicle body center plane C.

In the embodiment, the upper and lower sides, the front and rear sides, and the left and right sides coincide with the upper and lower sides, the front and rear sides, and the left and right sides in the motorcycle 1. The left-right direction coincides with the vehicle width direction of the motorcycle 1. One direction and the other direction in the vehicle width direction are the left and right directions, respectively.

Figure 2:
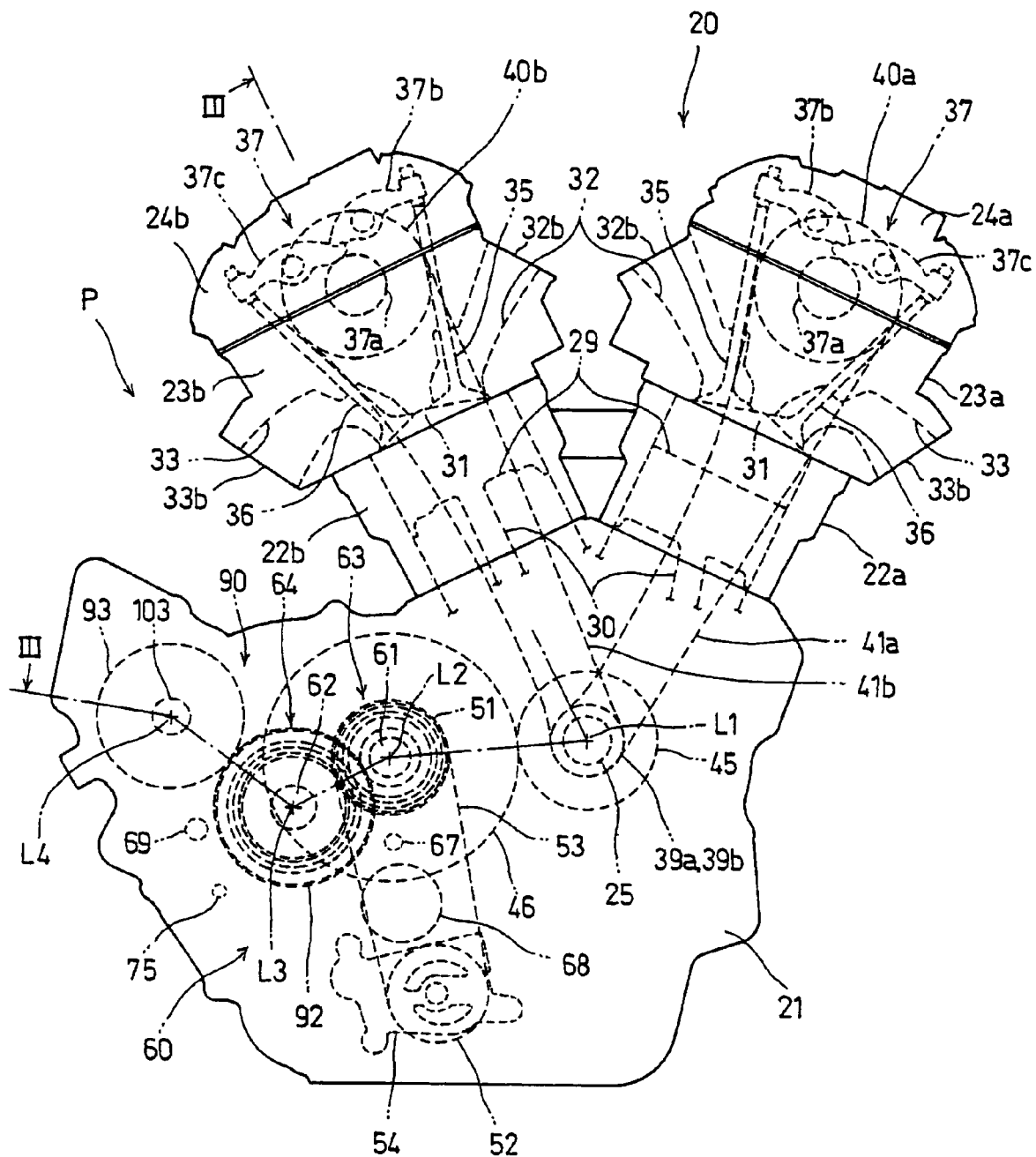
FIG. 2 is a general right side view of a power unit mounted on the motorcycle of FIG. 1.
Figure 3:
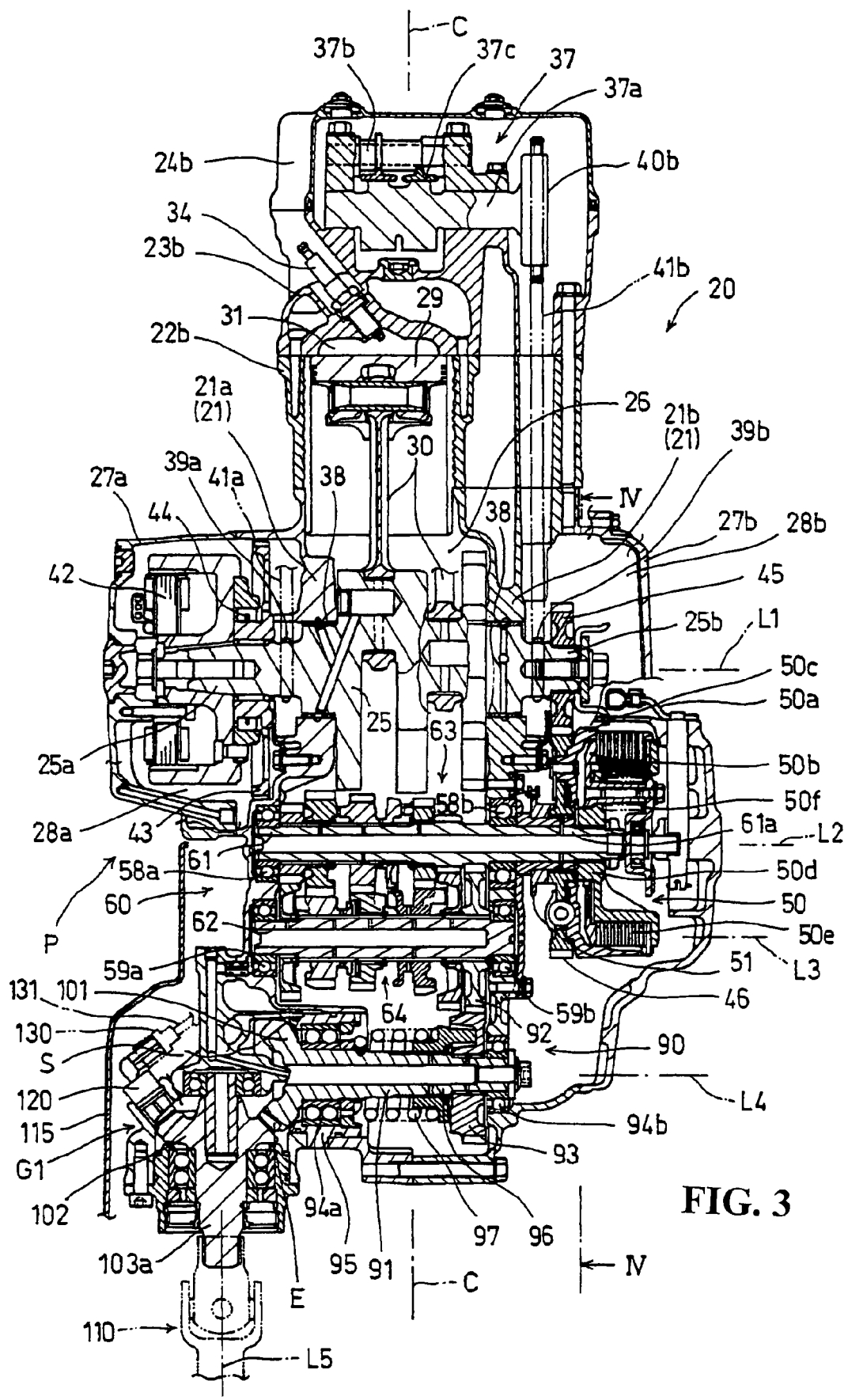
FIG. 3 is a sectional view along arrow III-III of FIG. 2, of the power unit of FIG. 2.

Referring to FIGS. 2 and 3, the power unit P includes an internal combustion engine 20 as an engine, a normally meshed type gear transmission 60 as a transmission to which a torque generated by the internal combustion engine 20 is transmitted, and a torque take-out mechanism 90 to which the torque from the transmission 60 is transmitted and which includes a torque take-out shaft 91.

The internal combustion engine 20 is a SOHC type water-cooled V type 2-cylinder 4-stroke internal combustion engine, and includes a crankcase 21, a pair of cylinders 22a, 22b constituting a front-rear pair of first and second banks which are connected to the crankcase 21 and disposed in a V-shape on the front and rear sides, cylinder heads 23a, 23b connected to the cylinders 22a, 22b, and head covers 24a, 24b connected to the cylinder heads 23a, 23b, respectively.

The crankcase 21 for rotatably supporting a crankshaft 25 having a rotational centerline L1 directed in the vehicle width direction is composed of a pair of first and second case halves 21a, 21b having a parting surface on a plane orthogonal to the rotational centerline L1. The crankshaft 25, the transmission 60 and the torque take-out mechanism 90 are contained in a crank chamber 26 defined by the crankcase 21. In addition, the first case half 21a and a first side cover 27a (see FIG. 1 also) connected to the first case half 21a form a first containing chamber 28a, and the second case half 21b and a second side cover 27b connected to the second case half 21b forming a second containing chamber 28b. Here, the crankcase 21 and the first and second side covers 27a, 27b are, respectively, a case for the power unit P and side covers.

Pistons 29 are reciprocatably fitted in the cylinders 22a, 22b and are connected to the crankshaft 25 through connecting rods 30. The cylinder heads 23a, 23b are each provided, on the basis of the cylinders 22a, 22b, with a combustion chamber 31 opposed to the piston 29 in the cylinder axis direction. One intake port 32 opens into the combustion chamber 31 at a pair of intake openings (only one intake opening is shown in FIG. 2) and one exhaust port 33 opens into the combustion chamber 31 at a pair of exhaust openings (only one exhaust opening is shown in FIG. 2). Further, each are provided with a spark plug 34 fronting on the combustion chamber 31, and a pair of intake valves 35 and a pair of exhaust valves 36 for, respectively, opening the pair of intake openings and the pair of exhaust openings.

The internal combustion engine 20 is further provided with an intake device, fuel injection valves as fuel supply devices, an exhaust system, and valve systems 37. The intake device is mounted to the inside of the V-bank at one-side surfaces of the cylinder heads 23a, 23b into which inlets 32b of the intake ports 32 open for directing quantities of air metered by throttle valves disposed in independent intake passages to the intake ports 32. In addition, the fuel injection valve for supplying a liquid fuel into the intake air is mounted to the intake device, and injects the fuel supplied from a fuel tank 13 (see FIG. 1) into the intake port 32. The exhaust system that is mounted to the outside of the V-bank at the other-side surfaces of the cylinder heads 23a, 23b into which outlets 33b of the exhaust ports 33 open direct an exhaust gas flowing out from the combustion chambers 31 through the exhaust ports 33 to the exterior of the internal combustion engine 20 through a silencer 9 (see FIG. 1).

In the banks, the valve systems 37 disposed in the valve chambers defined by the cylinder heads 23a, 23b and the head covers 24a, 24b open and close intake valves 35 and exhaust valves 36 synchronously with the rotation of the crankshaft 25. Therefore, the valve system 37 includes a camshaft 37a driven to rotate at a rotating speed of ½ of that of the crankshaft 25 by the power of the crankshaft 25, an intake rocker arm 37b and an exhaust rocker arm 37c swung, respectively, by an intake cam and an exhaust cam formed on the camshaft 37. The rotating intake cam and exhaust cam open and close the intake valve 35 and the exhaust valve 36 through the intake rocker arm 37b and the exhaust rocker arm 37c.

In each of the cylinders 22a, 22b, the air taken in through the intake device is sucked from the intake port 32 into the combustion chamber 31 after passing through the intake valve 35 opened in the intake stroke in which the piston 29 moves downwardly, and is compressed in the state of being mixed with the fuel in the compression stroke in which the piston 29 moves upwardly. The fuel-air mixture is combusted by being ignited by the spark plug 34 in the final stage of the compression stroke with the piston 29 being driven by the pressure of the combustion gas in the expansion stroke in which the piston 29 moves downwardly for driving the crankshaft 25 to rotate. The combustion gas is exhausted from the combustion chamber 31 into the exhaust port 33 as an exhaust gas after passing through the exhaust valve 36 in the exhaust stroke in which the piston 29 moves upwardly, and is exhausted further through the exhaust system to the exterior.

The crankshaft 25 is supported on the first and second case halves 21a, 21b through a pair of main bearings 38. One axial end portion 25a projects from the crank chamber 26 into the first containing chamber 28a and is provided with a drive sprocket 39a of a first valve-operating power transmission mechanism for driving the camshaft 37a in the first bank, an AC generator 42, and a one-way clutch 44 which is disposed between the drive sprocket 39a and the AC generator 42 and which transmits the torque of a starter driven gear 43 driven by a starter motor to the crankshaft 25 through a rotor of the AC generator 42. In addition, the other axial end portion 25b projecting from the crank chamber 26 into the second containing chamber 28b is provided with a drive sprocket 39b of a second valve-operating power transmission mechanism for driving the camshaft 37a in the second bank and with a primary drive gear 45 of a primary speed reduction mechanism.

The first and second valve-operating power transmission mechanisms are the same in configuration, and have drive sprockets 39a, 39b, cam sprockets 40a, 40b fixed to the camshafts 37a, and timing chains 41a, 41b wrapped around both the sprockets 39a, 40a; 39b, 40b.

The primary speed reduction mechanism contained in the second containing chamber 28b includes a primary drive gear 45 rotated as one body with the crankshaft 25, and a primary driven gear 46 meshed with the primary drive gear 45. The primary driven gear 46 is rotatably supported on an axial end portion 61a of a main shaft 61 of the transmission 60 which projects from the crank chamber 26 into the second containing chamber 28b.

A multiple disk frictional clutch 50 as a shift clutch that is provided at the axial end portion 61a and disposed in the second containing chamber 28b is put into a connected state and a disconnected state according to the frictional force between clutch disks 50e, by a mechanism in which a pressure plate 50b operated by a clutch operating mechanism 50a presses and releases a multiplicity of the clutch disks 50e fitted, respectively, to a clutch outer 50c integrally rotatably connected to the primary driven gear 46 and a clutch inner 50d integrally rotatably connected to the main shaft 61 by a springy force of a clutch spring 50f.

In addition, a drive sprocket 51 is provided at the axial end portion 61a, and an oil pump power transmission mechanism for driving an oil pump 54 is composed of the drive sprocket 51, a driven sprocket 52 provided on a pump shaft of the oil pump 54, and a chain 53 wrapped around both the sprockets 51, 52. Further, a rotary shaft of a cooling water pump for feeding cooling water cooled by the radiator 15 (see FIG. 1) under pressure into cooling water passages formed in the cylinders 22a, 22b and the cylinder heads 23a, 23b is coaxially connected to the above-mentioned pump shaft, and the cooling water pump is driven by the torque transmitted through the oil pump power transmission mechanism.

The transmission 60 has the main shaft 61 as an input shaft provided with an input-side shift gear group 63, and a counter shaft 62 as an output shaft provided with an output-side gear group 64 that is composed of shift gears normally meshed with shift gears of the input-side shift gear group 63. The main shaft 61 and the counter shaft 62 disposed in the crank chamber 26 are rotatably supported on the first and second case halves 21a, 21b through pairs of bearings 58a, 58b; 59a, 59b so that the rotational centerlines L2, L3 of the main shaft 61 and the counter shaft 62 are parallel to the rotational centerline L1 of the crankshaft 25. By shift gears function also as a shifter operated through a shift operation mechanism 65. Shift gears for transmitting the rotation of the main shaft 61 to the counter shaft 62 are selected from among the input-side shift gear group 63 and the output-side shift gear group 64, and the rotation of the main shaft 61 is transmitted to the counter shaft 62.

Figure 4:
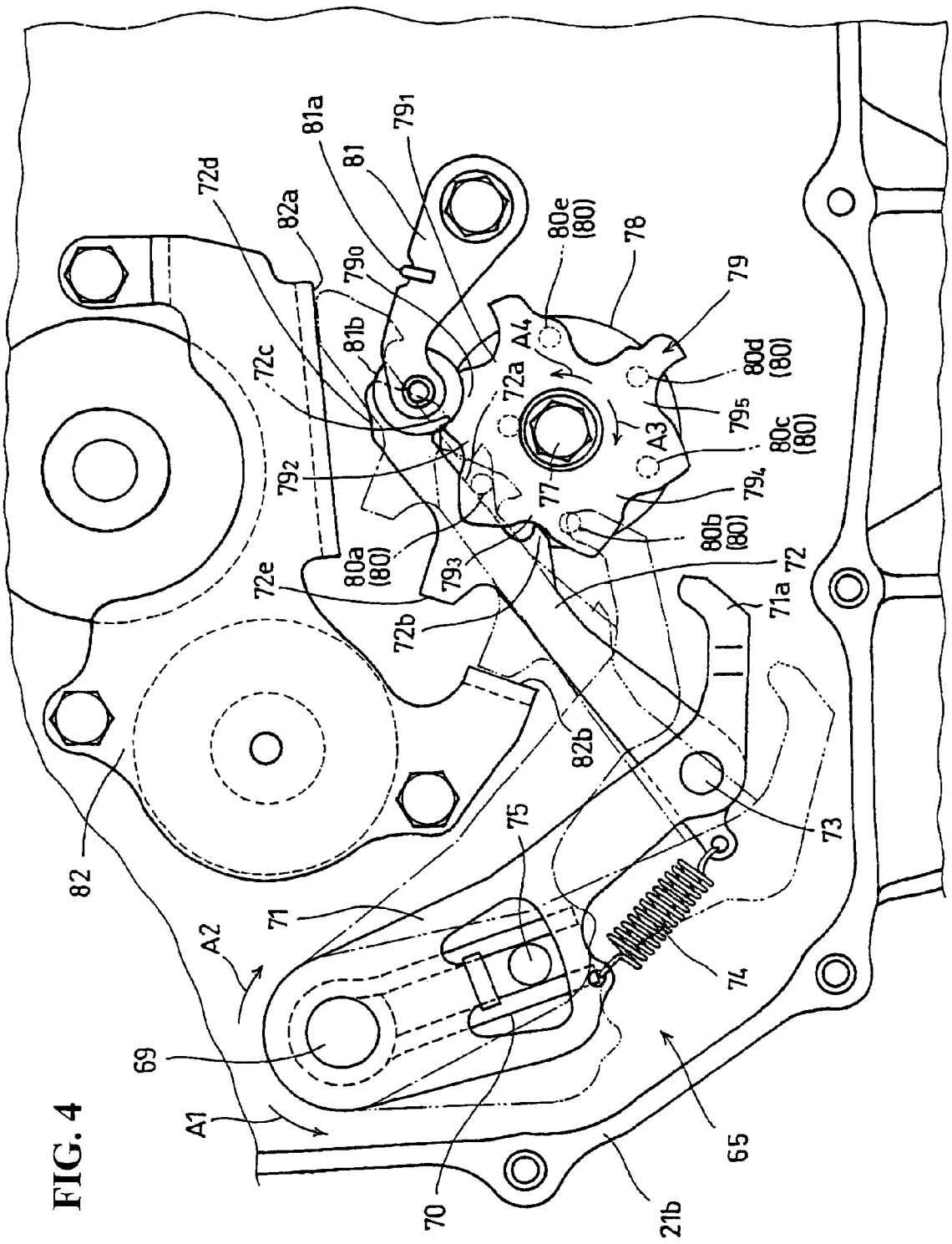
FIG. 4 is an essential part general view along arrow IV-IV of FIG. 3.

Referring mainly to FIG. 4, the shift operation mechanism 65 includes a shift arm mechanism including a change lever 66 (see FIG. 1) disposed on the left side of the vehicle, a shift drum 68 (see FIGS. 2 and 5) which is movably supported on a support shaft 67 (see FIG. 2) so as to operate the shifter and which is provided with cam grooves for moving three shift forks (not shown) in the directions of the rotational centerlines L2, L3, and a conversion mechanism for converting the motion of the shift arm mechanism into an intermittent rotating motion of the shift drum 68.

The shift arm mechanism includes a spindle 69 integrally rotatably connected to the change lever 66, a master arm 71 integrally rotatably connected to the spindle 69 and held in a basic position (indicated by solid lines in FIG. 4) by a springy force of a return spring 70, a shift arm 72 swingably connected to a rotary support portion provided on the master arm 71, and a pressure spring 74 provided between the master arm 71 and the shift arm 72. Both end portions of a return spring 70 composed of a torsional coil spring are engaged with pins 75 (see FIG. 2 also) fixed to the second case half 21b.

Figure 5:
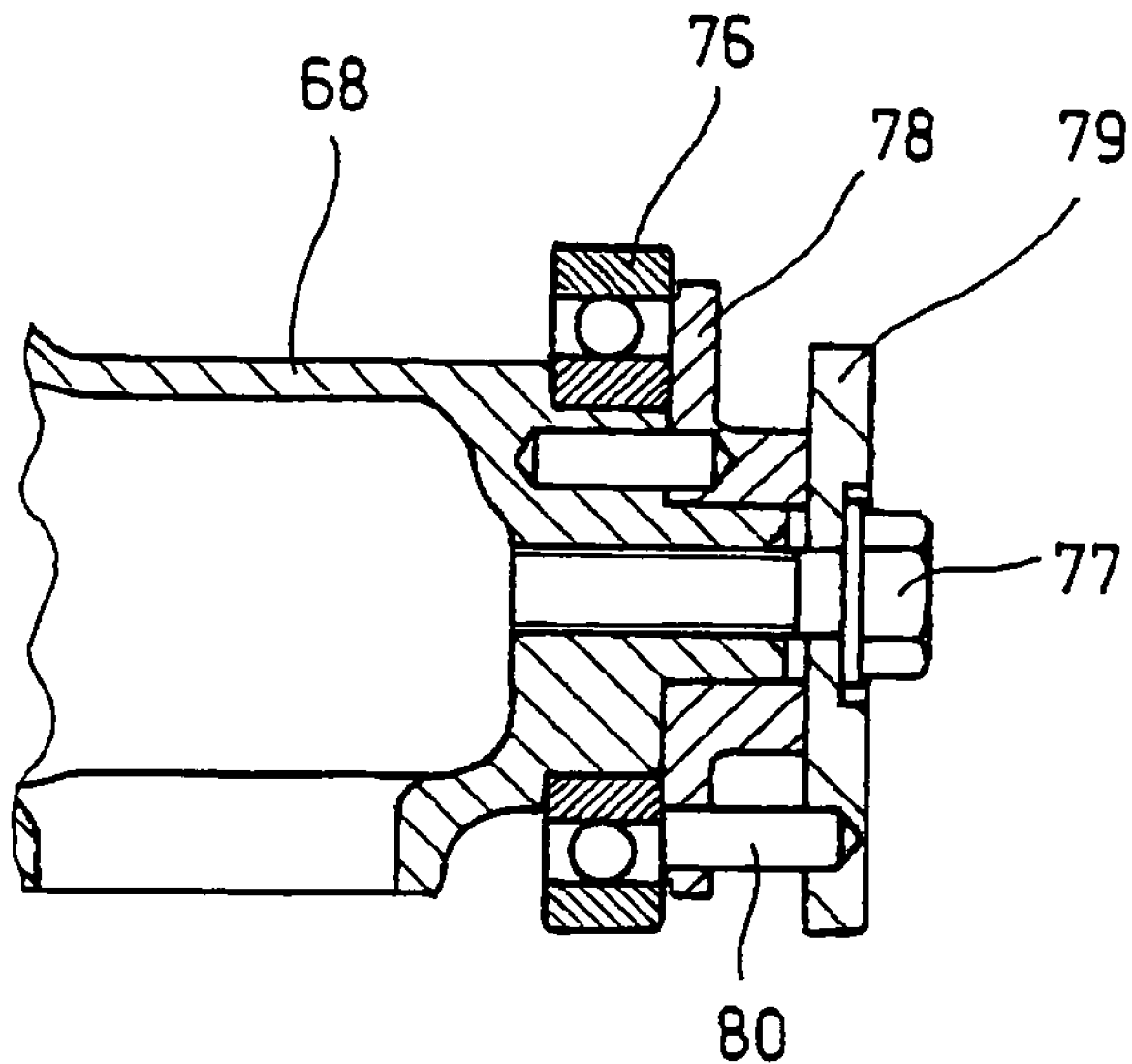
FIG. 5 is a sectional view of an essential part of a shift operation mechanism shown in FIG. 3.

Referring to FIGS. 4 and 5, the conversion mechanism includes a support plate 78 and a cam plate 79 integrally rotatably connected to an end portion, supported on the secondary case half 21b, of a shift drum 68 rotatably supported on the first and second case halves 21a, 21b, by a bolt 77. A plurality of shift pins 80 are supported by the support plate 78 and the cam plate 79 with a stopper lever 81 to be engaged with locking portions $79_0$-$79_5$ of the cam plate 79 corresponding to shift positions of the transmission 60 so as to hold a rotational position of the cam plate 79.

The shift arm 72, biased to swing inwards in the radial direction of the shift drum 68 around the rotary support portion 73 by the pressure spring 74, is provided with an engaging portion 72a engaged with the shift pins 80, a first pawl portion 72b engaged with the shift pins 80 at the time of shift-up and a second pawl portion 72c engaged with the shift pins 80 at the time of shift-down. A first abutment portion 72d abuts on a stopper portion 82a for restricting the movement of the shift arm 72 at the time of one shift-up operation, and a second abutment portion 72e abuts on a stopper portion 82b for restricting the movement of the shift arm 72 at the time of one shift-down operation. Here, both the stopper portions 82a, 82b are provided in a plate 82 which functions also as an inhibiting member for inhibiting the bearings 58b, 59b (see FIG. 3) from moving in the directions of the rotational centerlines L2, L3. The plate 82, which is a stopper portion forming member, is bolted to the second case half 21b. In FIG. 4, the master arm 71 and the shift arm 72 at the time of shift-up and at the time of shift-down are indicated by dot-dash lines and two-dot chain lines, respectively.

The stopper lever 81 includes a roller 81b engaged with the locking portions $79_0$-$79_5$ composed of recessed portions formed in the cam plate 79 in correspondence with the shift positions by a springy force of a spring 81a. In FIG. 4, the roller 81b is located at the locking portion $79_0$ corresponding to the neutral position of the transmission 60, and is further engaged, respectively, with the locking portions $79_1$, $79_2$, $79_3$, $79_4$, $79_5$ in correspondence with the shift positions of a first gear position, a second gear position, a third gear position, a fourth gear position, and a fifth gear position.

The master arm 71, rotated as one body with the change lever 66, is provided with a stopper portion 71a penetrating into the rotational orbit of the shift pin 80 at the time of shift-up. The stopper portion 71a formed as one body with the master arm 71 has such a shape as to extend straight from the vicinity of the rotary support portion 73, and is formed simultaneously with the formation of the master arm 71 from a plate material by press working.

Figure 6:
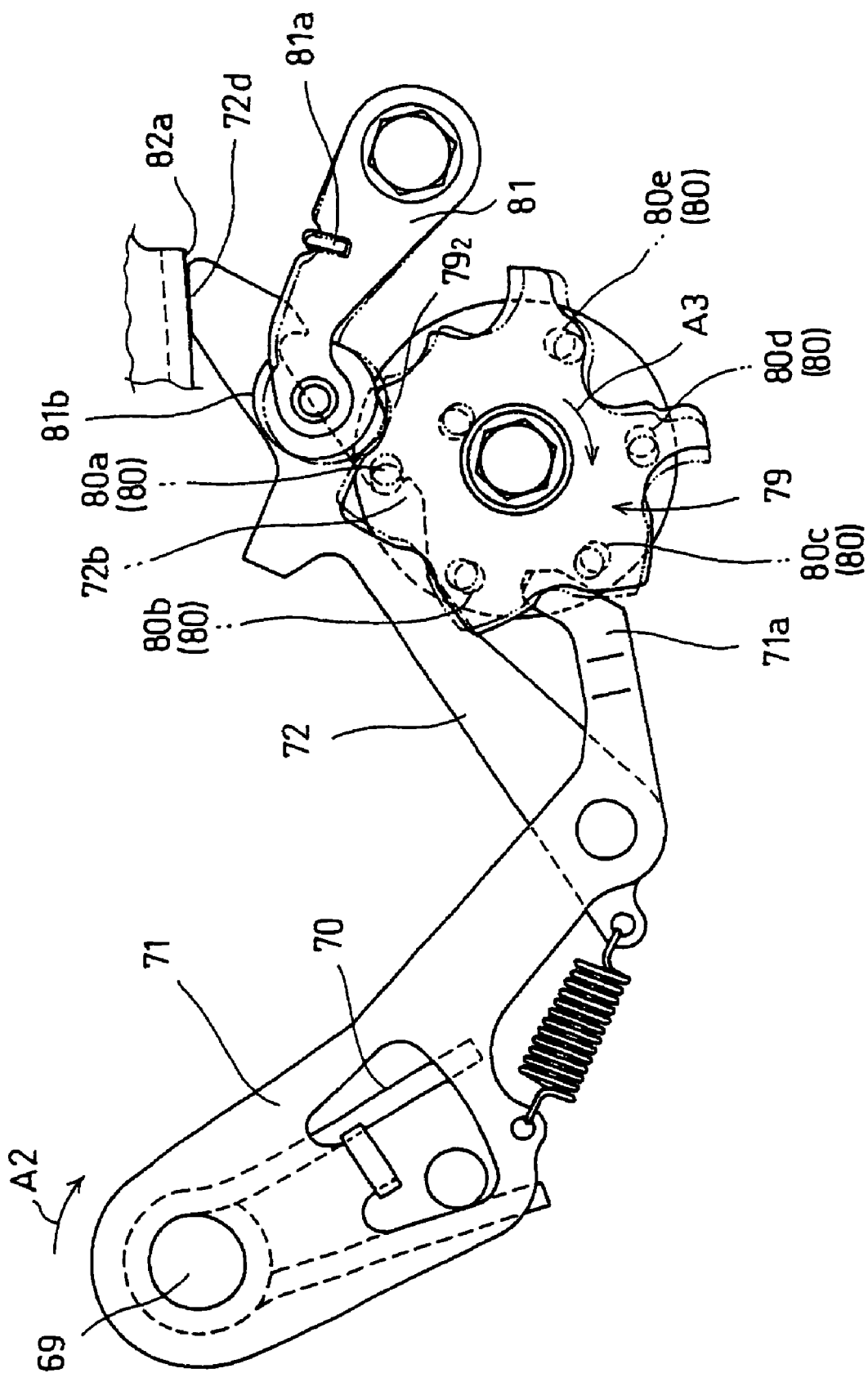
FIG. 6 is a view showing the condition, at the time of shift-up, of the shift operation mechanism shown in FIG. 3.
Figure 7:
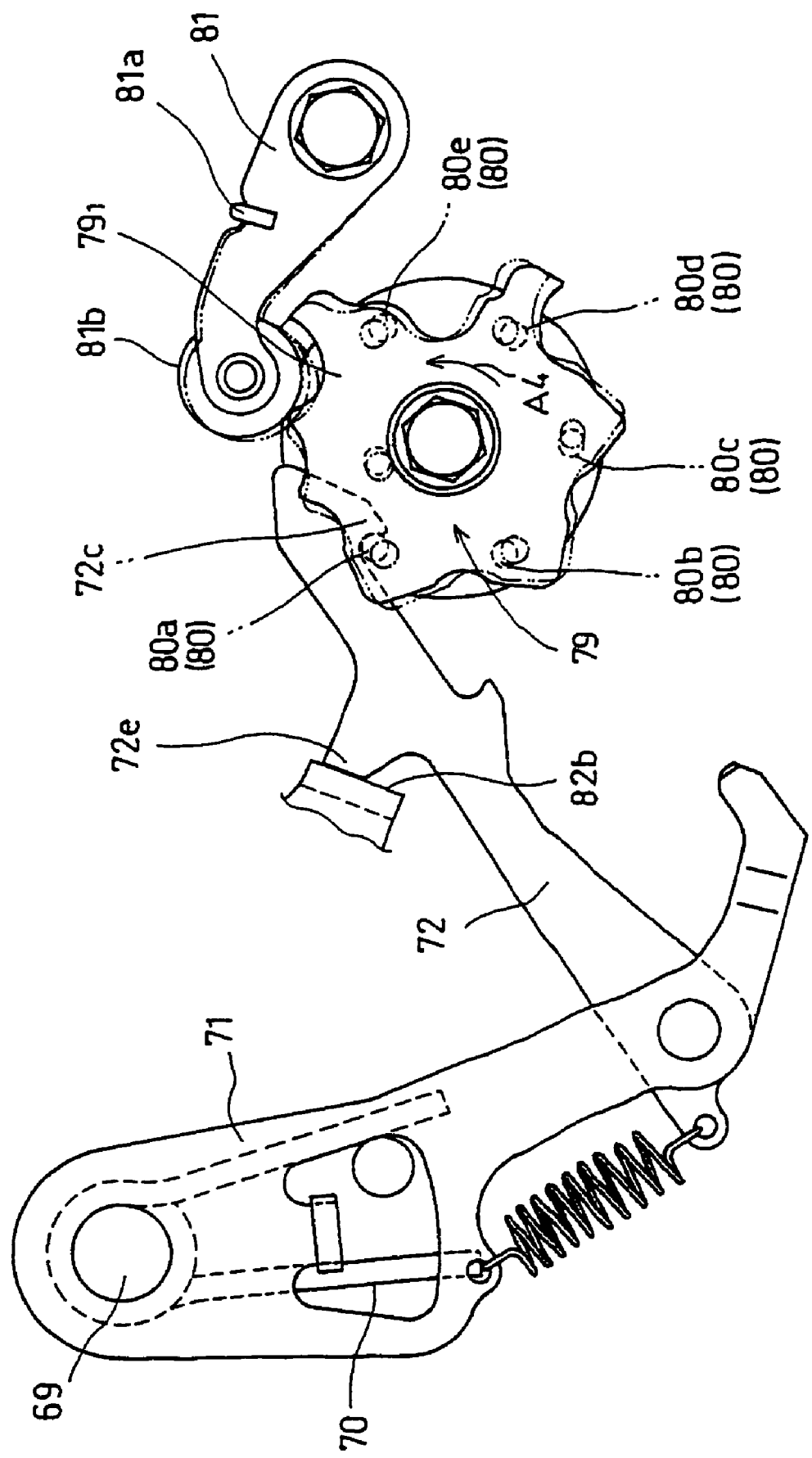
FIG. 7 is a view showing the condition, at the time of shift-down, of the shift operation mechanism shown in FIG. 3.

Referring to FIGS. 4, 6 and 7, the functions of the shift operation mechanism 65 will be described below.

At the time of a shift-up operation of the shift operation mechanism 65, when the change lever 66 is operated for shift-up from the condition where the master arm 71 is located in the basic position as shown in FIG. 4, the master arm 71 integral with the shift spindle 69 is swung in a direction A1, the shift arm 72 is simultaneously moved, the first pawl portion 72b pushes the shift pin 80a to rotate the shift drum 68 and the cam plate 79 in a rotating direction A3, and a first abutment portion 72d of the shift arm 72 abuts on the stopper portion 82a of the plate 82, resulting in the condition shown in FIG. 6 where movements of the master arm 71 and the shift arm 72 are stopped. During the shift-up operation, the stopper portion 71a is located on the rotational orbit of the shift pin 80 before the first abutment portion 72d abuts on the stopper portion 82a. Therefore, even if the change lever 66 is rapidly operated vigorously and the shift drum 68 is about to be rotated further in the rotating direction A3, a shift pin 80c located on the counter-rotating direction side relative to the stopper portion 71a abuts on the stopper portion 71a to prevent the shift drum 68 from rotating in excess, and an operation of skipping an intrinsic shift position to the next shift position by a one-time operation of the change lever 66 is prevented. As indicated by two-dot chain lines in FIG. 6, the roller 81b of the stopper lever 81 biased by the spring 81a is engaged with the locking portion $79_2$ at a stable position, whereby the second gear position is established.

Next, when the change lever 66 is released, the master arm 71 is moved in a direction A2 opposite to the direction A1, and the shift pin 80 rides over the first pawl portion 72b against the springy force of the pressure spring 74, to be engaged with an engaging portion 72a. Each time the shift-up operation is performed, in the same mode as above, the first pawl portion 72b pushes the shift pin 80, whereby a one stage higher shift position is established sequentially, and, in that instance, excessive rotation of the shift drum 68 is prevented by the stopper portion 71a.

When a shift-down operation is performed starting from the condition shown in FIG. 4, the master arm 71 is swung in the direction A2, the shift arm 72 is simultaneously moved, the second pawl portion 72c pushes the shift pin 80 to rotate the shift drum 68 and the cam plate 79 in the rotating direction A4, and the second abutment portion 72e abuts on the stopper portion 82b of the plate 82, resulting in the condition shown in FIG. 7 where movements of the master arm 71 and the shift arm 72 are stopped. In this instance, when the shift drum 68 is about to be rotated further in the rotating direction A4, a shift pin 80e located on the counter-rotating direction side relative to the second pawl portion 72c abuts on the second pawl portion 72c, to prevent the shift drum 68 from being rotated excessively. As indicated by two-dot chain lines in FIG. 7, the roller 81b is engaged with the locking position $79_1$ at a stable position, whereby the first gear position is established. Each time the shift-down operation is performed, in the same mode as above, the second pawl portion 72c pushes the shift pin 80, whereby a one stage lower shift position is established sequentially, and, in that instance, excessive rotation of the shift drum 68 is prevented by the second pawl portion 72c.

Figure 8:
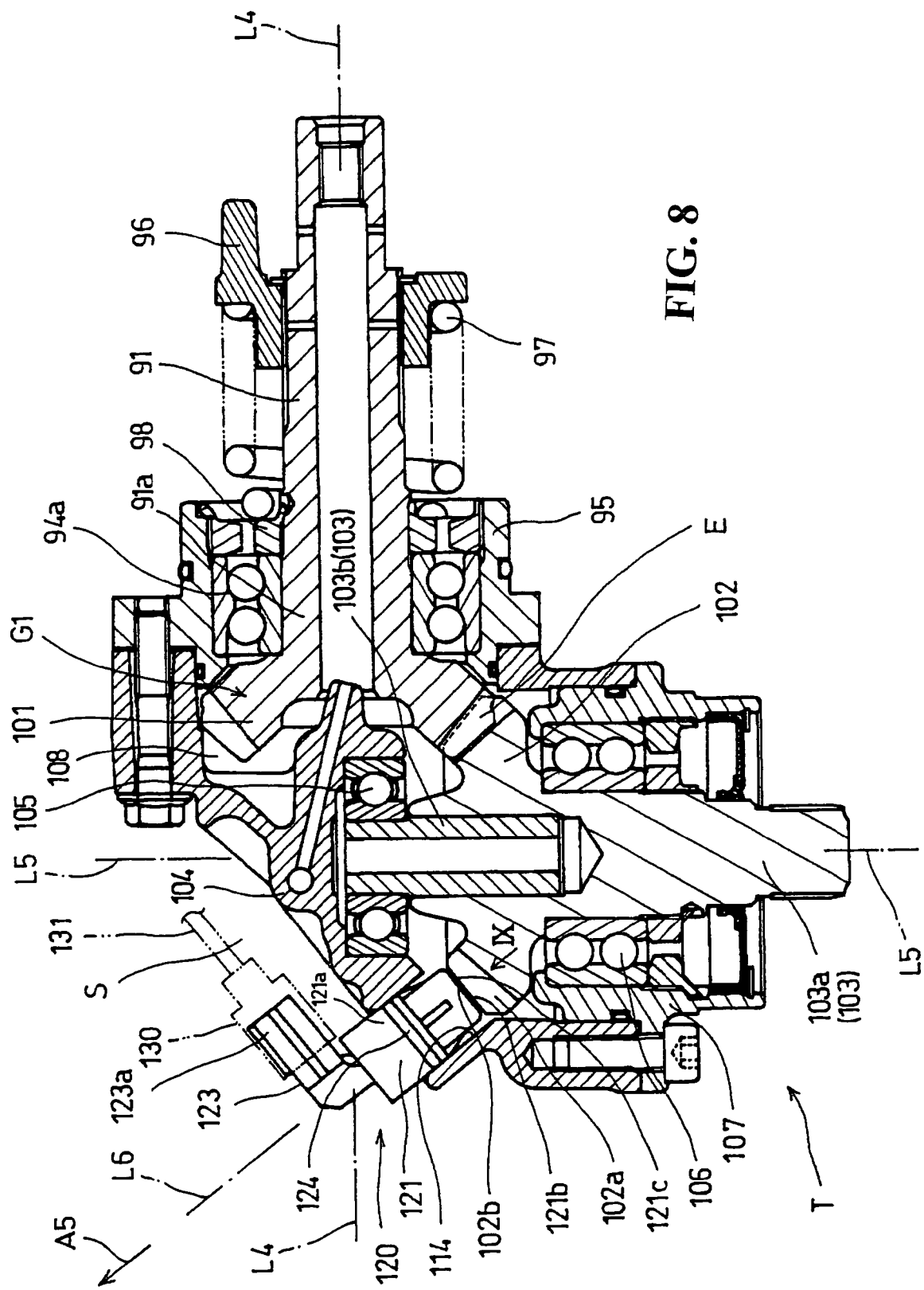
FIG. 8 is a sectional view showing the power unit shown in FIG. 3 and a part of a torque transmission mechanism.

Referring to FIGS. 3 and 8, the torque take-out mechanism 90 includes a torque take-out shaft 91 rotatably supported on the crankcase 21, and a gear pair composed of a drive gear 92 integrally rotatably provided on the counter shaft 62 and a driven gear 93 integrally rotatably provided on the torque take-out shaft 91. The torque take-out shaft 91 is rotatably supported on the first and second case halves 21a, 21b through a pair of bearings 94a, 94b, and the bearing 94a on one side is held by a bearing holder 95 connected to the first case half 21a. The driven gear 93, rotatably supported on the torque take-out shaft 91, is engaged, in the rotating direction, with a damper cam 96 spline-fitted on the torque take-out shaft 91. The damper cam 96 and a damper spring 97, which is disposed between the damper cam 96 and a lock nut 98 for fixing the bearing 94a, constitute a damper mechanism for absorbing torque variations generated from the crankshaft 25 and torque variations transmitted from the rear wheel 11 which act on a drive shaft 100.

The torque transmission mechanism T will be described below referring to FIGS. 3 and 8.

An input-side gear pair G1 interposed between the torque take-out shaft 91 and the drive shaft 100 (see FIG. 1) is composed of a drive gear 101 consisting of a bevel gear integrally rotatably provided on the torque take-out shaft 91, and a driven gear 102 consisting of a bevel gear which is integrally rotatably provided on a first intermediate shaft 103 and is meshed with the drive gear 101. The drive gear 101 provided at an axial end portion 91a, in one sense of the vehicle width direction, of the torque take-out shaft 91 is formed integrally with the torque take-out shaft 91 in this embodiment. The first intermediate shaft 103 is composed of a first shaft portion 103a integrally provided with the driven gear 102, and a second shaft portion 103b press fitted in the first shaft portion 103a. The second shaft portion 103b is supported through a bearing 105 on a gear case 104 which, together with a bearing holder 107, forms a gear chamber 108 for containing the drive gear 101 and the driven gear 102 therein. The first shaft portion 103a is supported through the bearing 106 on the bearing holder 107 connected to the gear case 104.

A meshing area E between the drive gear 101 and the driven gear 102 and the torque take-out shaft 91 are located on the inside in the vehicle width direction relative to the rotational centerline L5 of the driven gear 102 or the first intermediate shaft 103, and the meshing area E is located on the rear side relative to the torque take-out shaft 91. In addition, the torque take-out shaft 91 does not project to the left side relative to the drive gear 101, and the second shaft portion 103b does not project to the front side relative to the torque take-out shaft 91. Therefore, a space S is formed on the front side relative to the rotational centerline L4 of the torque take-out shaft 91 and on the outer side in the vehicle width direction relative to the rotational centerline L5 of the driven gear 102, with reference to the gear case 104.

Referring to FIG. 1, a front end portion of the drive shaft 100 is connected to the first shaft portion 103a through a universal joint 110 (see FIG. 3 also), and a rear end portion of the drive shaft 100 is connected to the second intermediate shaft to which a driven gear 111 is connected.

An output-side gear pair G2 is composed of the drive gear 111 consisting of a bevel gear integrally rotatably provided on the second intermediate shaft, and a driven gear 112 consisting of a bevel gear which is integrally rotatably provided on a rotary shaft integrally rotatably connected to a hub of the rear wheel 11 and which is meshed with the drive gear 111. The drive gear 111 and the driven gear 112 are contained in a gear chamber formed by a gear case 113.

In this manner, the torque generated by the internal combustion engine 20 is transmitted from the crankshaft 25 through the above-mentioned primary speed reduction mechanism to the clutch 50, and is transmitted further to the transmission 60. The torque transmitted to the transmission 60 is transmitted from the main shaft 61 to the counter shaft 62 in the transmission 60 operated by the shift operation mechanism 65, the torque of the counter shaft 62 is transmitted to the torque take-out shaft 91, and, further, the drive torque of the torque take-out shaft 91 is transmitted through the torque transmission mechanism T to the rear wheel 11.

Now, a vehicle speed sensor 120 will be described below.

Figure 9:
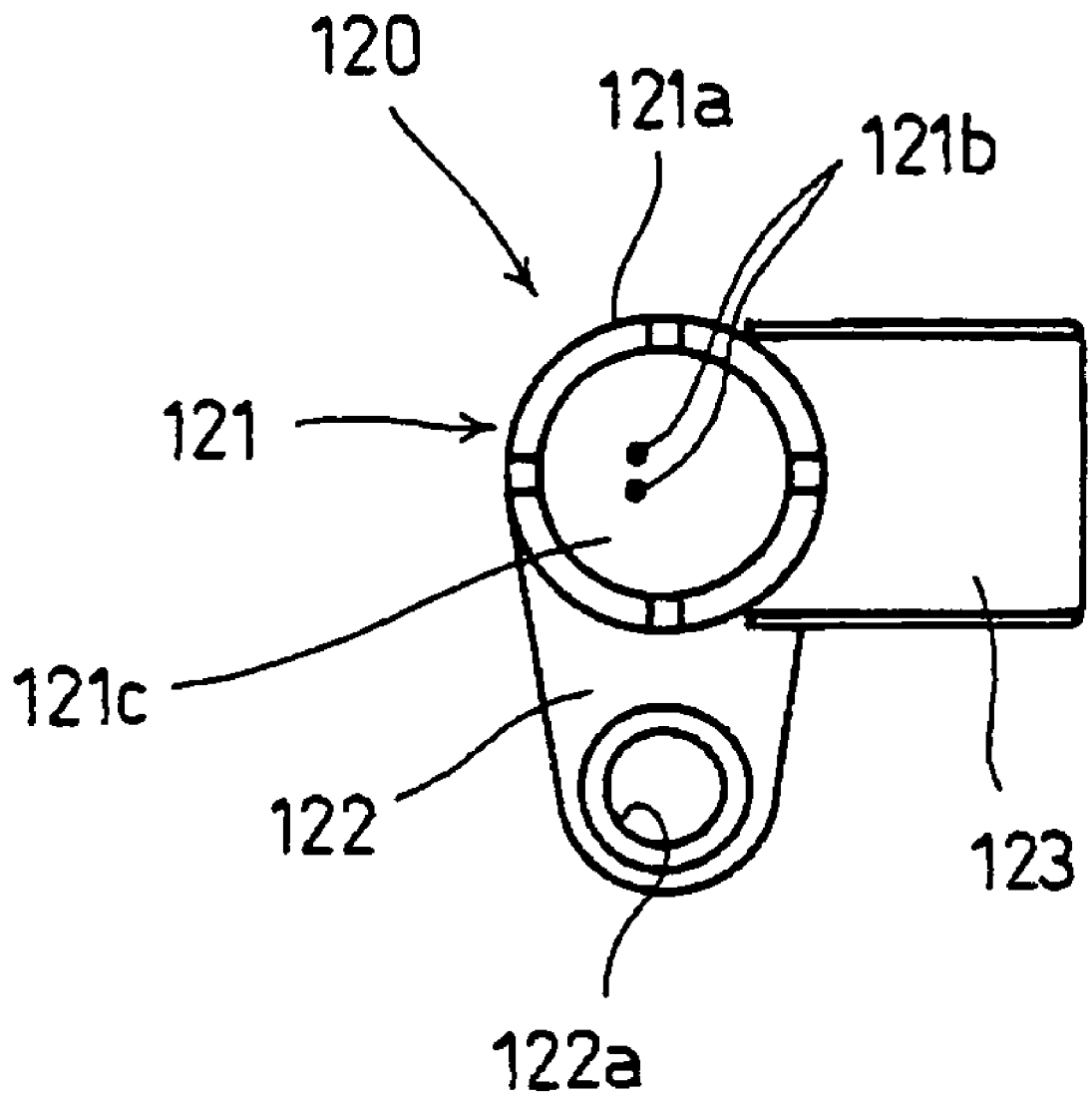
FIG. 9 is a view along arrow IX of FIG. 8.

Referring to FIGS. 8 and 9, the vehicle speed sensor 120 includes a main body portion 121 fitted in a mount hole 114 formed in the gear case 104 on the outer side in the vehicle width direction relative to the rotational centerline L5, a mount portion 122 provided with a bolt insertion hole 122a for bolting to the gear case 104, and a terminal portion 123 to which a coupler 130, having electric wires 131 connected to the above-mentioned electronic control unit, is connected. In addition, the main body portion 121 disposed on the outer side in the vehicle width direction relative to the rotational centerline L5 has an outer peripheral surface 121a consisting of a cylindrical surface with an outside diameter slightly smaller than that of the mount hole 114 which is circular in section, and a detecting portion 121b opposed to the addendum surfaces 102b of a multiplicity of teeth 102a in the direction A5 of the normal to the addendum cone surface of the driven gear 102. Here, the addendum cone surface means an imaginary rotational surface drawn by the bevel gear constituting the driven gear 102.

The vehicle speed sensor 120 is a magnetic induction type sensor with a magnetically reacting element that is incorporated in the main body portion 121, for example, a sensor using a Hall device. The vehicle speed sensor 120 detects a magnetic flux variation generated by the passage of the teeth 102a through the detecting portion 121b, and outputs a detection signal corresponding to the rotating speed of the driven gear 102 based on the magnetic flux variation.

The detecting portion 121b is located on a tip end surface 121c of the main body portion 121 composed of a plain surface orthogonal to the center axis line L6 of the above-mentioned outer peripheral surface 121a, and the vehicle speed sensor 120 is mounted to the gear case 104 so that the detecting portion 121b and the addendum surface 102b are parallel to each other, in the condition of being opposed in the normal direction A5 to the addendum surface 102b of the teeth 102a of the driven gear 102 being rotated. In addition, between the gear case 104 and the main body portion 121, an annular seal member 124 is provided over the entire circumference of the main body portion 121.

The main body portion 121 is disposed to extend along the normal direction A5, in the condition where the main body portion 121 is fitted in the mount hole 114 and the vehicle speed sensor 120 is mounted to the gear case 104 at a set position and where the center axis line L6 coincides with the above-mentioned normal or the center axis line L6 coincides with a direction (which is also the normal direction A5) orthogonal to the tip end surface 102b. In this instance, the detecting portion 121b is opposed to the addendum surface 102b in the normal direction A5, and a predetermined gap optimum for detection accuracy is formed in the normal direction A5 between the addendum surface 102b and the detecting surface 121b. In addition, the normal direction A5 coincides with the mounting direction of the vehicle speed sensor 120.

The terminal portion 123 projects relative to the main body portion 121 in the radial direction thereof. More specifically, in a direction orthogonal to the center axis line L6. In the condition where the vehicle speed sensor 120 is mounted at the above-mentioned set position, most portions near the tip end portion 123a of the terminal portion 123 and a coupler 130 are disposed in the space S.

In addition, referring to FIG. 3, on the left side of the vehicle body, a gear case side cover 115 (see FIG. 1 also), connected to the gear case 104, is disposed on the left side which is the outer side in the vehicle width direction relative to the vehicle speed sensor 120, to cover the entire part of the vehicle speed sensor 120 and covers a part near the gear case 104 of the power unit P and most part of the gear case 104 from the left side.

Now, the functions and effects of the embodiment configured as above-described will be described below.

The vehicle speed sensor 120 provided in the motorcycle 1 includes the main body portion 121 having the detecting portion 121b opposed to the addendum of the teeth 102a in the direction A5 normal to the addendum cone surface of the driven gear 102 of the torque transmission mechanism T. The main body portion 121 is disposed to extend along the normal direction A5, so that the direction in which the detecting portion 121b is opposed to the addendum and the direction in which the main body portion 121 extends coincide with each other. Therefore, a versatile ordinary vehicle speed sensor for detecting a rotating speed can be used as the vehicle speed sensor 120 in which the multiplicity of teeth 102a of the driven gear 102, consisting of a bevel gear, constitute the portion to be detected. Thus, a reduction in cost is achieved. Moreover, since the gap in the normal direction A5 between the detecting portion 121b of the vehicle speed sensor 120 and the addendum surface 102b does not vary depending on the mounting position of the vehicle speed sensor 120 in the circumferential direction, it is easy to adjust the gap between the vehicle speed sensor 120 and the addendum for securing a detection accuracy. Thus, the mountability of the vehicle speed sensor 120 is enhanced. Further, since the projection amount of the vehicle speed sensor 120 on the outside in the radial direction of the driven gear 102 is reduced, the vehicle speed sensor 120 can be disposed compactly on the outside in the radial direction of the driven gear 102, and the degree of freedom in laying out the vehicle speed sensor 120 is increased.

The vehicle speed sensor 120 is so configured that the teeth 102a of the driven gear 102 constituting the gear pair G1 interposed between the torque take-out shaft 91 and the drive shaft 100 constitute the portion to be detected, and the main body portion 121 is disposed on the outer side in the vehicle width direction relative to the rotational centerline L5 of the driven gear 102, whereby the projection amount of the vehicle speed sensor 120 to the outside in the vehicle width direction is reduced, notwithstanding the main body portion 121 is disposed on the outside in the vehicle width direction. Therefore, the vehicle speed sensor 120 can be disposed compactly in the vehicle width direction. The gear case side cover 115 which is disposed on the left side, i.e., the outside in the vehicle width direction relative to the vehicle speed sensor 120 and which covers the vehicle speed sensor 120 is reduced in size in the vehicle width direction.

The meshing area E between the drive gear 101 and the driven gear 102 and the torque take-out shaft 91 are located on the inner side in the vehicle width direction relative to the rotational centerline L5 or the first intermediate shaft 103, whereby it is ensured that the drive gear 101 and the torque take-out shaft 91 are not present on the outer side in the vehicle width direction relative to the rotational centerline L5 where the vehicle speed sensor 120 is disposed. Therefore, the space S can be formed in the surroundings of the vehicle speed sensor 120, and the degree of freedom in laying the electric wires 131 connected to the vehicle speed sensor 120 is increased.

Further, with the meshing area E being located on the rear side relative to the torque take-out shaft 91, the space S is large on the front side and in the vehicle width direction and is formed with reference to the gear case 104, which contributes to an increase in the degree of freedom in laying the electric wires 131. In addition, since the torque take-out shaft 91 does not project to the left side relative to the drive gear 101 and the second shaft portion does not project to the front side relative to the torque take-out shaft 91, the space S is made to be larger. Thus, most parts of the terminal portion 123 and the coupler 130 are disposed in the space S, and the coupler 130 and the electric wires 131 present due to the provision of the vehicle speed sensor 120 can be disposed compactly in the vehicle width direction. Further, this contributes to a reduction in size of the gear case side cover 115 in the vehicle width direction.

In the shift operation mechanism 65, the master arm 71 is provided with the stopper portion 71a penetrating into the rotational orbit of the shift pin 80 at the time of shift-up, and the stopper portion 71a is formed simultaneously with the formation of the master arm 71, whereby bending needed in the case of forming the stopper portion 71a by forming the master arm 71 by die-cutting from a plate material and then bending the master arm 71 is unnecessary. Thus, a reduction in cost is achieved.

Furthermore, since the stopper portion 71a is formed so as to penetrate into the rotational orbit of the shift pin 80 before the first abutment portion 72d abuts on the stopper portion 82a, the stopper portion 71a is located on the rotational orbit of the shift pin 80 before the first abutment portion 72d abuts on the stopper portion 82a during the shift-up operation. Therefore, even if the change lever 66 is rapidly operated vigorously and the shift drum 68 is about to be rotated further in the rotating direction A3, the shift pin 80c located on the counter-rotating direction side relative to the stopper portion 71a abuts on the stopper portion 71a to thereby prevent the shift drum 68 from being rotated excessively. Thus, an operation of skipping an intrinsic shift position to the next shift position by a one-time operation of the change lever 66 is prevented. Therefore, the shift position can be sequentially changed by one shift stage at a time, so that the accuracy of the shift change at the time of shift-up is enhanced.

Now, embodiments obtained by modifying the configuration of a part of the above-described embodiment will be described below, referring to the modified configurations.

The engine may be a prime mover other than the internal combustion engine, for example, an electric motor.

The vehicle speed sensor 120 may be so configured wherein the teeth of the drive gear 101 constituting the gear pair G1 or the teeth of one of the drive gear 111 and the driven gear 112 constituting the gear pair G2, in place of the driven gear 102, constitute the portion to be detected.

In a power unit not including a torque take-out shaft separately from the output shaft of the transmission, the torque take-out shaft may be composed of the output shaft (e.g., the counter shaft 62) of the transmission. In addition, the transmission may be a transmission other than the gear transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
   a power unit having an engine and a torque take-out shaft for outputting a torque generated by said engine as a drive torque;
   a torque transmission mechanism comprising a gear pair composed of bevel gears and a drive shaft, for transmitting said drive torque from said torque take-out shaft to a drive wheel; and
   a vehicle speed sensor operatively positioned relative to gear teeth for detecting rotation of one of a drive gear and a driven gear;

wherein said vehicle speed sensor comprises a main body portion having a detecting portion opposed to an addendum of said one gear in a direction normal to a face cone surface of said one gear, said main body portion is mounted to extend in said normal direction for adjusting a gap between the vehicle speed sensor and the addendum for ensuring detection accuracy, wherein the driven gear includes a first shaft portion integrally provided therewith, and a second shaft portion press fitted into an axial hole of the first shaft portion, and further including a ring of first bearings adapted to directly support said first shaft portion of said driven gear for rotation, and a ring of second bearings adapted to directly support said second shaft portion for rotation, the ring of first bearings and the ring of second bearings being disposed on opposite sides of the driven gear, wherein the ring of first bearings and the ring of second bearings have diameters that are different from each other.

2. The motorcycle as set forth in claim 1, wherein said drive gear is operatively connected to said torque take-out shaft, and an imaginary line extending along an axis of the take-out shaft extends through the vehicle speed sensor.

3. The motorcycle as set forth in claim 1, wherein the vehicle speed sensor is a magnetic induction sensor.

4. The motorcycle as set forth in claim 1, and further including a damper cam operatively mounted relative to the torque take-out shaft for absorbing torque variations transmitted from a drive shaft.

5. The motorcycle as set forth in claim 1, and further comprising an annular seal member provided over an entire circumference of the main body portion.

6. The torque transmission for use with a vehicle as set forth in claim 1, and further comprising an annular seal member provided over an entire circumference of the main body portion.

7. The torque transmission for use with a vehicle as set forth in claim 1, wherein the second shaft portion is supported through the second ring of bearing on a gear case which, together with a bearing holder, forms a gear chamber for containing the drive gear and the driven gear therein, and the first shaft portion is supported through the first ring of bearing another bearing holder connected to the gear case.

8. The torque transmission for use with a vehicle as set forth in claim 1, wherein said gear pair is interposed between said torque take-out shaft and said drive shaft extending in the front-rear direction, said one gear is said driven gear connected to said drive shaft and having a rotational centerline extending in the front-rear direction, and said main body portion is disposed on the outer side in the vehicle width direction relative to said rotational centerline.

9. The torque transmission for use with a vehicle as set forth in claim 8, wherein a meshing portion, between said drive gear and said driven gear, and said torque take-out shaft are located on the inner side in the vehicle width direction relative to said rotational centerline, wherein an outer-most diameter of the meshing area of the driven gear is larger than an outer-most diameter of the meshing area of the drive gear.

10. The motorcycle as set forth in claim 9, wherein said meshing area is located on a rear side relative to the torque take-out shaft.

11. The motorcycle as set forth in claim 1, the ring of first bearings includes two rings of first bearings mounted on a bearing holder fixed to a gear case.

12. The motorcycle as set forth in claim 11, wherein the second shaft portion extends from said driven gear in a direction opposite from said first shaft portion, and the ring of second bearings is mounted in the gear case, and wherein a ring of third bearings adapted to operatively support said drive gear for rotation is mounted on another bearing holder.

13. The motorcycle as set forth in claim 1, wherein the torque take-out shaft does not project to a left side relative to the drive gear and the second shaft portion does not project to the front side relative to the torque take-out shaft for forming a space on a front side relative to a rotational centerline of the torque take-out shaft and on an outer side of the vehicle width direction relative to a rotational centerline of the driven gear.

14. The motorcycle as set forth in claim 13, wherein a terminal portion of the vehicle speed sensor projects relative to the main body portion in the radial direction thereof, and most portions near a tip end portion of the terminal portion and a coupler are disposed in the space.

15. A torque transmission for use with a vehicle comprising:

a torque transmission mechanism comprising a gear pair composed of bevel gears and a drive shaft, for transmitting drive torque from a torque take-out shaft to a drive wheel; and a vehicle speed sensor operatively positioned relative to gear teeth for detecting rotation of one of a drive gear and a driven gear;

wherein said vehicle speed sensor comprises a main body portion having a detecting portion opposed to an addendum of said one gear in a direction normal to a face cone surface of said one gear, said main body portion is mounted to extend in said normal direction for adjusting a gap between the vehicle speed sensor and the addendum for ensuring detection accuracy, wherein the driven gear includes a first shaft portion integrally provided therewith, and a second shaft portion press fitted into an axial hole of the first shaft portion, and further including a ring of first bearings adapted to directly support said first shaft portion of said driven gear for rotation, and a ring of second bearings adapted to directly support said second shaft portion for rotation, the ring of first bearings and the ring of second bearings being disposed on opposite sides of the driven gear, wherein the ring of first bearings and the ring of second bearings have diameters that are different from each other.

16. The torque transmission for use with a vehicle as set forth in claim 15, wherein said drive gear is operatively connected to said torque take-out shaft, and an imaginary line extending along an axis of the take-out shaft extends through the vehicle speed sensor.

17. The torque transmission for use with a vehicle as set forth in claim 15, wherein the vehicle speed sensor is a magnetic induction sensor.

18. The torque transmission for use with a vehicle as set forth in claim 15, and further including a damper cam operatively mounted relative to the torque take-out shaft for absorbing torque variations transmitted from a drive shaft.

19. The torque transmission for use with a vehicle as set forth in claim 15, wherein said gear pair is interposed between said torque take-out shaft and said drive shaft extending in the front-rear direction, said one gear is said driven gear connected to said drive shaft and having a rotational centerline extending in the front-rear direction, and said main body portion is disposed on the outer side in the vehicle width direction relative to said rotational centerline.

20. The torque transmission for use with a vehicle as set forth in claim 19, wherein a meshing portion, between said drive gear and said driven gear, and said torque take-out shaft are located on the inner side in the vehicle width direction relative to said rotational centerline, wherein an outer-most diameter of the meshing area of the driven gear is larger than an outer-most diameter of the meshing area of the drive gear.

21. The torque transmission for use with a vehicle as set forth in claim 20, wherein said meshing area is located on a rear side relative to the torque take-out shaft.

22. The motorcycle as set forth in claim 15, the ring of first bearings includes two rings of first bearings mounted on a bearing holder fixed to a gear case.

23. The motorcycle as set forth in claim 22, wherein the second shaft portion extends from said driven gear in a direction opposite from said first shaft portion, the ring of second bearings is mounted in the gear case and wherein a ring third bearings adapted to operatively support said drive gear for rotation is mounted on another bearing holder.

24. The torque transmission for use with a vehicle as set forth in claim 15, wherein the torque take-out shaft does not project to a left side relative to the drive gear and the second shaft portion does not project to the front side relative to the torque take-out shaft for forming a space on a front side relative to a rotational centerline of the torque take-out shaft and on an outer side of the vehicle width direction relative to a rotational centerline of the driven gear.

25. The torque transmission for use with a vehicle as set forth in claim 24, wherein a terminal portion of the vehicle speed sensor projects relative to the main body portion in the radial direction thereof, and most portions near a tip end portion of the terminal portion and a coupler are disposed in the space.

* * * * *